United States Patent [19]
Sano et al.

[11] Patent Number: 5,324,203
[45] Date of Patent: Jun. 28, 1994

[54] ELECTRICAL HARNESSING STRUCTURE FOR VEHICLE

[75] Inventors: Yukiharu Sano; Hiroshi Suzuki, both of Shizuoka; Seiji Hirano, Hiroshima; Masaaki Shimizu, Iwakuni; Osamu Michihira, Hiroshima; Yoshikazu Nobutoki, Higashihiroshima, all of Japan

[73] Assignees: Yazaki Corporation, Tokyo; Mazda Motor Corp., Hiroshima, both of Japan

[21] Appl. No.: 126,689

[22] Filed: Sep. 27, 1993

Related U.S. Application Data

[63] Continuation of Ser. No. 26,088, Mar. 4, 1993, abandoned, which is a continuation of Ser. No. 797,917, Nov. 26, 1991, abandoned.

[30] Foreign Application Priority Data

Nov. 30, 1990 [JP] Japan ................... 2-340093
Mar. 28, 1991 [JP] Japan ................... 3-019374

[51] Int. Cl.⁵ .......................................... H01R 33/00
[52] U.S. Cl. ................................. 439/34; 174/72 A; 296/70; 180/90
[58] Field of Search ................ 439/34; 174/72 A; 296/70; 180/90

[56] References Cited

U.S. PATENT DOCUMENTS 4,360,241 11/1982 Fukunaga ................... 439/34
4,942,499 7/1990 Shibata et al. ............... 439/34
4,943,241 7/1990 Watanabe et al. ............ 439/34

FOREIGN PATENT DOCUMENTS

| 2334343 | 9/1989 | European Pat. Off. |
|---|---|---|
| 3529660C2 | 2/1986 | Fed. Rep. of Germany |
| 3609609C2 | 10/1987 | Fed. Rep. of Germany |
| 3710642A1 | 10/1988 | Fed. Rep. of Germany |
| 116334 | 5/1987 | Japan ............ 439/34 |
| 67809 | 3/1989 | Japan ........... 174/72 A |
| 1-190551 | 7/1989 | Japan |
| 63-219446 | 9/1989 | Japan |

Primary Examiner—Gary F. Paumen

[57] ABSTRACT

An electrical harnessing structure for connecting to vehicle electrical components to an instrument panel, which is constituted by an instrument panel core to which the vehicle electrical components are mounted, and an instrument panel mount member for mounting the instrument panel core to a vehicle body component portion. The harnessing structure includes an electrical harnessing member divided at least into a first electrical harnessing member portion and a second electrical harnessing member portion, and consisting of a bundle of a plurality of electric wires, a first mounting member for mounting the first electrical harnessing member portion to the instrument panel mount member, a second mounting member for mounting the second electrical harnessing member portion to the instrument panel core, and a connect member for connecting the first and second electrical harnessing member portions to each other.

10 Claims, 9 Drawing Sheets

ELECTRICAL HARNESSING STRUCTURE FOR VEHICLE

This application is a continuation of prior application Ser. No. 08/026,088, filed on Mar. 4, 1993, now abandoned, which is a continuation of parent application Ser. No. 07/797/917, filed Nov. 26, 1991, now abandoned.

BACKGROUND OF THE INVENTION

The present invention relates to an electrical harnessing structure for a vehicle, which structure is arranged on a predetermined vehicle body component of a vehicle and, for example, to an electrical harnessing structure of electrical components for a vehicle, arranged in an instrument panel of the vehicle.

In recent years, vehicle components of an automobile tend to be assembled to a vehicle main body by automatic machines. In this automatic assembling system, an instrument panel located at a front portion in a passenger room, sub assemblies (e.g., a meter node and a switch node) constituting the instrument panel, and the like must be suitable for the automatic assembling operations.

As described in Japanese Patent Laid-Open No. 1-190551, the instrument panel is divided into two panel units, i.e., a skeleton instrument panel mount member directly mounted on the vehicle body cowl panel, and an instrument panel core mounted on the instrument panel mount member. Various sub assemblies such as a meter node, a switch node, and the like are assembled to the instrument panel core, thus facilitating the assembling operations.

However, even when the above-mentioned instrument panel structure is adopted, an electrical harnessing structure of electrical components to be arranged in the instrument panel poses problems.

More specifically, in recent years, since the number of electrical components is increased, a wire harness for electrically connecting these components tends to have a large diameter and a large capacity. Therefore, it is not easy to arrange the wire harness, and complicated distributions and connections of electric wires require very difficult operations. In this manner, the arrangement structure in a conventional harness state cannot possibly cope with the above-mentioned automatic assembling operations.

In order to solve this problem, the following attempt is made, as disclosed in, e.g., Japanese Patent Laid-Open No. 63-219446. That is, a wire harness itself is hardened to have a fixed pattern using a synthetic resin member so as to form a three-dimensional electrical harnessing member corresponding to a distribution pattern of electric wires. The three-dimensional electrical harnessing member having a fixed pattern is connected in correspondence with an arrangement metal board, which is three-dimensionally arranged according to the shape of an inner surface portion of an instrument panel, connector positions, and the like, so as to attain the automatic assembling operations.

This structure can cope with the automatic assembling operations. However, this structure requires complicated processes for the wire harness. In addition, connector fitting positions do not have a sufficient degree of freedom. Therefore, connector fitting portions are apt to cause decentering unless a molding process is controlled so that all the connector positions have considerably high precision.

SUMMARY OF THE INVENTION

The present invention has been made in consideration of the above situation, and has as its object to provide an electrical harnessing structure for a vehicle, which can automatically assemble an electrical harnessing member without requiring complicated processes of a wire harness.

It is another object of the present invention to provide an electrical harnessing structure for a vehicle, which can facilitate alignment and arrangement of connectors, and can easily attain inter-connections upon assembling.

It is still another object of the present invention to provide an electrical harnessing structure for a vehicle, which can suppress decentering of connector fitting portions in an automatic assembling operation of an electrical harnessing member.

It is still another object of the present invention to provide an electrical harnessing structure for a vehicle, which integrally comprises a control unit, can be very easily connected to the control unit, and can greatly decrease the number of electric wires.

In order to achieve the above objects, according to the first aspect of the present invention, there is provided an electrical harnessing structure for connecting to vehicle electrical components to an instrument panel, which is constituted by an instrument panel core to which the vehicle electrical components are mounted, and an instrument panel mount member for mounting the instrument panel core to a vehicle body component portion, which comprises: an electrical harnessing member having a bundle of a plurality of electric wires, the electrical harnessing member being divided at least into a first electrical harnessing member portion and a second electrical harnessing member portion, first mounting means for mounting the first electrical harnessing member portion to the instrument panel mount member, second mounting means for mounting the second electrical harnessing member portion to the instrument panel core, and connect means for connecting the first and second electrical harnessing member portions to each other.

In the electrical harnessing structure according to the second aspect of the present invention, the first electrical harnessing member portion performs electrical harnessing of electrical components to be mounted on a front surface portion of the instrument panel core, and the second electrical harnessing member portion performs electrical harnessing of electrical components to be mounted on an upper surface portion of the instrument panel core.

The electrical harnessing structure according to the third aspect of the present invention further comprises a control unit, arranged on a portion where the first and second electrical harnessing member portions are connected to each other, for executing a predetermined control sequence.

In the electrical harnessing structure according to the fourth aspect of the present invention, the control unit is mounted on the instrument panel mount member.

In the electrical harnessing structure according to the fifth aspect of the present invention, the control unit is mounted on the first electrical harnessing member portion.

In the electrical harnessing structure according to the sixth aspect of the present invention, the control unit comprises a connector portion to which the connect means is connected.

In the electrical harnessing structure according to the seventh aspect of the present invention, the first electrical harnessing member portion comprises a connector to be connected to a vehicle, a connector for connecting the control unit, a connector for connecting a fuel lid opener switch, a connector for connecting a trunk lid opener switch, a connector for connecting an air conditioner switch, a connector for connecting audio equipment, a connector for connecting a center console, a connector for connecting meters, and a connector for connecting column switches.

In the electrical harnessing structure according to the eighth aspect of the present invention, the second electrical harnessing member portion comprises a connector for connecting a solar radiation sensor for auto lighting control, a connector for connecting a glove box lamp, a connector for connecting a glove box lamp switch, a connector for connecting a solar radiation sensor for an air conditioner, and a connector for connecting the control unit.

In the electrical harnessing structure according to the ninth aspect of the present invention, a connecting portion between the first and second electrical harnessing member portions is located at a position near a fixing portion between the instrument panel core and the instrument panel mount member.

As described above, in the electrical harnessing structure for a vehicle according to the present invention, the electrical harnessing member having a bundle of a plurality of electric wires is divided into the first and second electrical harnessing member portions. The first electrical harnessing member portion is mounted on the instrument panel mount member to be mounted on the vehicle body, and the second electrical harnessing member portion is mounted on the instrument panel core. Therefore, the electrical harnessing member can be easily assembled to the instrument panel units. The connector means for interconnecting the first and second electrical harnessing member portions is arranged. In a final assembling operation, all the connections can be completed in a one-touch manner by fitting and connecting the connector means.

The first electrical harnessing member portion performs harnessing of electrical components mounted on the front surface portion of the instrument panel. The second electrical harnessing member portion performs harnessing of electrical components mounted on the upper surface portion of the instrument panel. Thus, the electrical components are grouped depending on their positions so as to systematically discriminate connection lines. Therefore, the alignment and arrangement of connectors are easy, and interconnections upon assembling are also easy.

Since the predetermined control unit is arranged at the inter-connecting portion between the first and second electrical harnessing member portions, connections of the control unit, which requires connections of a large number of electric wires, can be very easy, and the number of electric wires can be greatly reduced.

The inter-connecting portion between the first and second electrical harnessing member portions is located at a position near a fixing portion between the instrument panel core and the instrument panel mount member having high rigidity. For this reason, a fixing state is stabilized, and connectors can be easily aligned when they are fitted. As a result, decentering upon fitting of connectors, and contact errors after connections can be prevented.

Therefore, according to the electrical harnessing structure for a vehicle of the present invention, productivity and assembling operability of the electrical harnessing member itself can be improved in correspondence with improved assembling operability due to the divided instrument panel unit. This structure can appropriately cope with automatic assembling operations of the overall instrument panel.

Since concentrated wiring can be attained, the number of connecting portions such as connectors can also be decreased. Furthermore, assembling precision itself can consequently be improved.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

Arrangements of various embodiments of an electrical harnessing structure for a vehicle according to the present invention will be described hereinafter. In the first embodiment, an arrangement, which employs a multiplex transmission system for an instrument panel, will be described in detail below with reference to FIGS. 1 through 8.

Figure 1:
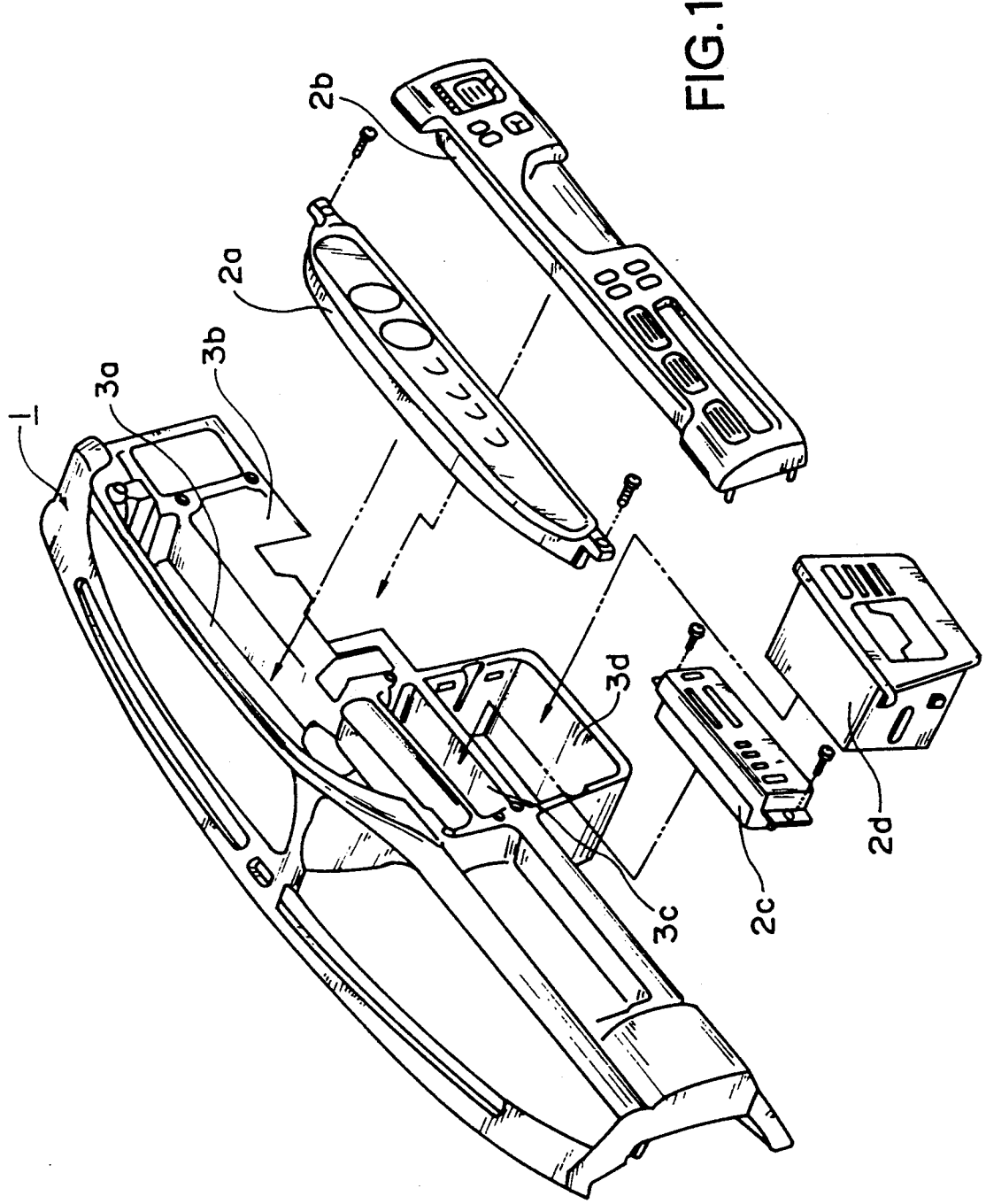
FIG. 1 is an exploded perspective view of an instrument panel, which adopts an electrical harnessing structure according to the first embodiment of the present invention, when viewed from the rear side of a vehicle body.
Figure 2:
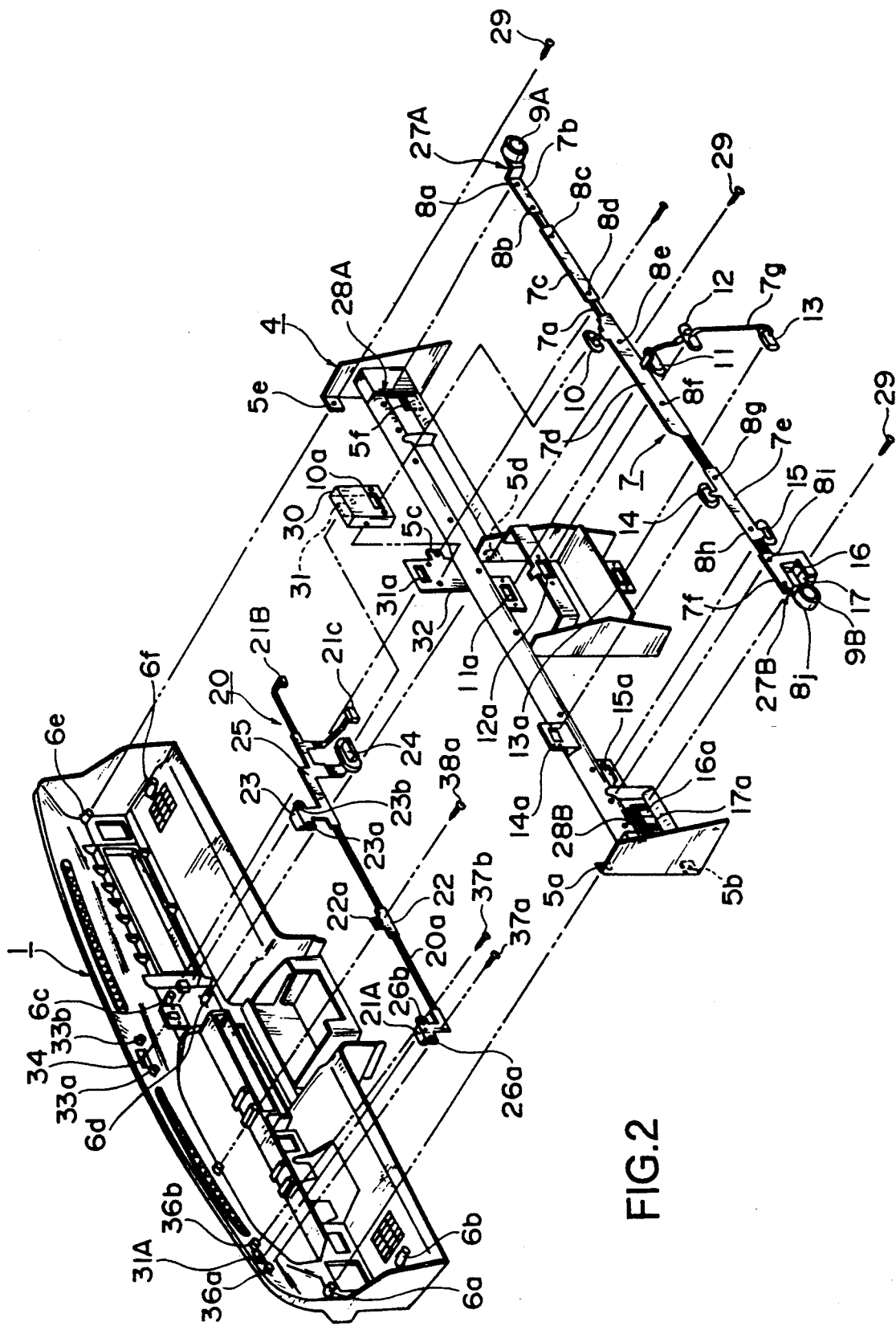
FIG. 2 is an exploded perspective view of the instrument panel for the vehicle shown in FIG. 1 when viewed from the front side of the vehicle body.

FIG. 1 shows an exploded state of the overall instrument panel for a vehicle of the first embodiment when it is seen through from the upper rear side of a vehicle body. FIG. 2 shows the internal structure of the instrument panel, and an electrical harnessing when they are seen from the upper front side of the vehicle body.

As shown in FIG. 1, the instrument panel comprises, as a basic portion, an instrument panel core 1 arranged at a front portion in a passenger room of this vehicle to extend in the widthwise direction of the vehicle body.

The instrument panel core 1 is formed by integral molding of, e.g., a synthetic resin. On the front-side surface (i.e., the rear-side surface in the back-and-forth direction of the vehicle body) of the instrument panel core 1, electrical component node mounting portions 3a through 3d for mounting various nodes, e.g., a meter node 2a on which various meters are arranged, a general switch node 2b on which various operation switches are arranged, an air conditioner node 2c on which various switches for an air conditioner are arranged, an audio node 2d in which audio equipment is arranged, and the like, are formed.

On the other hand, on the rear-side surface (i.e., the front surface side in the back-and-forth direction of the vehicle body) of this instrument panel core 1, an instrument panel mount member 4 is arranged, as shown in FIG. 2. The instrument panel core 1 is fixed to a cowl panel (not shown) of a vehicle body through the instrument panel mount member 4.

More specifically, the instrument panel mount member 4 comprises a frame member having a skeleton structure. The instrument panel mount member 4 is provided with coupling flange portions 5a through 5f, which are respectively coupled to helical base 6a through 6f formed at proper positions on the rear surface of the instrument panel core 1.

In FIG. 2, reference numeral 7 denotes a first electrical harnessing member fixed to the instrument panel mount member 4; and 20, a second electrical harnessing member fixed to the inner side of the instrument panel core 1.

The first electrical harnessing member 7 comprises, e.g., a flat type wire harness (a bundle of electric wires) 7a as a harnessing member main body. First through fifth fixing members (mounting portions) 7b through 7f are independently and integrally attached to the wire harness 7a. These first through fifth fixing members 7b through 7f each have a thick plate shape consisting, e.g., of a thermosetting resin, and are respectively formed with pairs of screw insertion holes 8a through 8j used for fixing the electrical harnessing member 7 to the instrument panel mount member 4 through screws 29.

As shown in FIG. 2, stepped portions 27A and 27B, which are bent to this side in FIG. 2 (i.e., the front side in the back-and-forth direction of the vehicle body) are formed on the outer side portions of the first and fifth fixing members 7b and 7f located at two ends. Cylindrical vehicle connection connectors 9A and 9B to be coupled to cowl-side main connector portions (not shown) are arranged on the rear-side surfaces (i.e., the front surfaces in the back-and-forth direction of the vehicle body) of portions deviated to this side in FIG. 2 via the corresponding stepped portions 27A and 27B, so that the central axes of the connectors 9A and 9B are aligned with each other in the back-and-forth direction of the vehicle body. These vehicle connection connectors 9A and 9B are stably fixed to the cowl panel when their front-side surfaces (i.e., the rear-side surfaces in the back-and-forth direction of the vehicle body) are respectively pressed by projecting portions 28A and 28B formed on the instrument panel mount member 4.

A first connector 10 for connecting an electronic control unit module (ECU module) is arranged on the upper right side portion (FIG. 2) of the third fixing member 7d, which is located at substantially the central portion. A connection cord 7g branched from the wire harness is connected to the lower central portion of the third fixing member 7d so as to extend downward. The connection cord 7g is provided with a connector 11 for connecting the air conditioner switch node, a connector 12 for connecting the audio node, and a connector 13 for connecting a center console node in turn from the upper portion to the lower portion of the cord 7g. A connector 14 for connecting the meter node is arranged on the upper right side portion (FIG. 2) of the fourth fixing member 7e located on the left side (FIG. 2) of the third fixing member 7d, and a connector 15 for connecting a column switch node is arranged on the lower left side portion (FIG. 2) of the fourth fixing member 7e.

Figure 3:
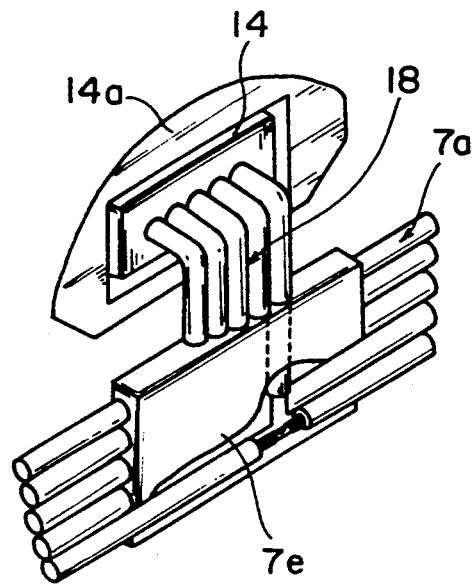
FIG. 3 is an enlarged perspective view of a principal part showing a detailed arrangement of a connector portion for connecting a meter node in the structure of the first embodiment.

As the connector 14 for connecting the meter node, a fixing member and a wiring branching structure, as shown in FIG. 3, can be arbitrarily employed. More specifically, as shown in FIG. 3, a flat cable is used as the flat type wire harness 7a, and a branch cable 18 branching from the wire hardness 7a comprises a flat cable like the wire harness 7a. The connector 14 for connecting the meter node is connected to the distal end of the branch cable 18. A wiring branching portion where the branch cable 18 branches from the wire harness 7a is covered with a thermosetting resin, thus forming the fourth fixing member 7e.

Figure 4:
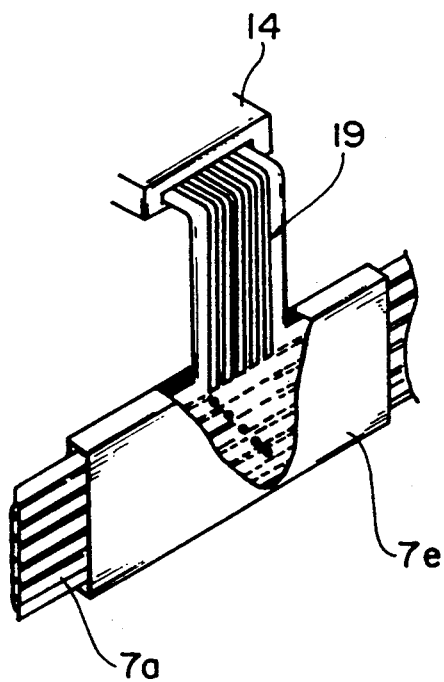
FIG. 4 is an enlarged perspective view showing a first modification of the arrangement of the connector portion shown in FIG. 3.
Figure 5:
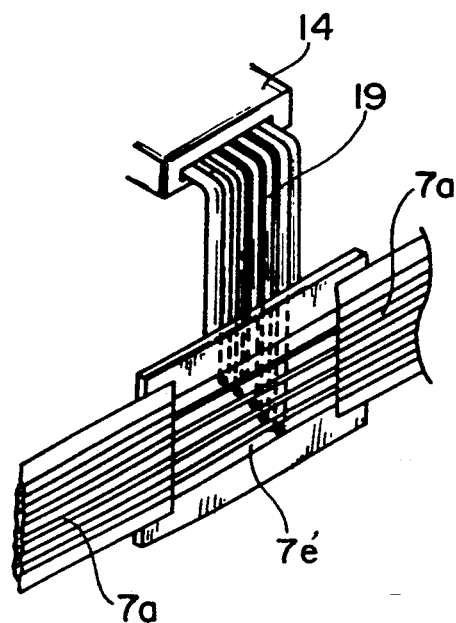
FIG. 5 is an enlarged perspective view showing a second modification of the arrangement of the connector portion shown in FIG. 3.

The present invention is not limited to the use of the flat cable as the flat type wire harness 7a. For example, the fixing member and the wiring branch structure can be modified, as shown in FIGS. 4 and 5 showing the first and second modifications. More specifically, in the first modification shown in FIG. 4, an FPC (flexible printed circuit board) is used as the flat type wire harness 7a, and a branch cable 19 branching from the wire harness 7a comprises an FPC like the wire harness 7a. A wiring branching portion is covered with a thermosetting resin in the same manner as in the arrangement shown in FIG. 3, thus forming the fourth fixing member 7e.

In the second modification shown in FIG. 5, the FPCs are used as the flat wire harness 7a and the branch cable 19 like in the first modification shown in FIG. 4, while a fourth fixing member 7e' is formed of a PCB (printed circuit board), thus maintaining the connection state of the wire harness 7a, and electrically connecting the wire harness 7a to the branch cable 19 through a wiring network printed on the circuit board.

Referring again to FIG. 2, a connector 16 for connecting a fuel lid opener switch node, and a connector 17 for connecting a trunk lid opener switch node are juxtaposed on the lower portion of the fifth fixing member 7f of the first electrical harnessing member 7. As has already been described above, the vehicle connection connector 9B is integrally arranged on the portion of the fifth fixing member 7f deviated to the front side of the vehicle body through the stepped portion 27B.

Fixing fitting opening portions (receptacles) 10a, 11a, 12a, 13a, 14a, 15a, 16a, and 17a corresponding to the connectors 10 through 17 of the first electrical harnessing member 7 corresponding to the nodes are mounted on the instrument panel mount member 4. When the connectors are fitted in the corresponding receptacles, the first electrical harnessing member 7 can be reliably attached and electrically connected to the instrument panel mount member 4.

In FIG. 2, reference numeral 30 denotes the above-mentioned electronic control unit module (ECU module), which comprises a CPU, a RAM, a ROM, and the like, and has a multiplex communication controller. The ECU module 30 is attached on the rear-side surface (i.e., the front-side surface in the back-and-forth direction of the vehicle body) of a module mounting plate 32 integrally arranged on the upper central portion of the instrument panel mount member 4 in the first embodiment.

The first receptacle 10a for receiving the first connector 10, provided to the first electrical harnessing member 7, for connecting the ECU module is arranged on the lower portion of the rear-side surface of the ECU module 30. A second receptacle 31 is arranged on the upper portion of the front-side surface (i.e., the rear-side surface in the back-and-forth direction of the vehicle body) of the ECU module 30. The second receptacle 31 is fitted in a receptacle fitting opening 31a of the module mounting plate 32, so that the ECU module 30 can be fixed to the instrument panel mount member 4.

On the other hand, the second electrical harnessing member 20, which is arranged to be substantially parallel to the first electrical harnessing member 7, mainly comprises a flat type wire harness 20a like in the first electrical harnessing member 7. A connector 21A for connecting a solar radiation sensor for auto lighting control is arranged on the left end portion (FIG. 2) of the wire harness 20a. A connector 21B for connecting a glove box lamp, and a connector 21C for connecting a glove box lamp switch are arranged on the right end portion (FIG. 2) of the wire harness 20a so as to respectively branch upward and downward. A fixing portion 22 formed of a thermosetting resin, a connector 23 for connecting a solar radiation sensor for an auto air conditioner, and a connector 24 for connecting the ECU module are arranged on the middle portion of the wire harness 20a in turn from the left side to the right side in FIG. 2.

The connector 23 for connecting the solar sensor for the auto air conditioner, and the connector 24 for connecting the ECU module are coupled to a fixing member 25 formed of a thermosetting resin. The connector 21A for connecting the solar radiation sensor for auto lighting control has a lug like flange portion at its proximal end side. The connector 21A is fastened and fixed to corresponding helical bases 36a and 36b formed on the back surface of the instrument panel core 1 through screw insertion holes 26a and 26b formed in the left and right portions of the flange portion, and screws 37a and 37b. In this fixing state, the connector 21A portion is fitted in a connector fitting opening 31A of the instrument panel core 1, and is connected to the solar radiation sensor (not shown) for auto lighting control.

A flange portion for fastening and fixing the fixing member 22 is formed also on the upper portion side of the fixing member 22. The fixing member 22 is fixed to a helical base 35 formed on the instrument panel core 1 through a screw hole 22a formed in the flange portion, and a screw 38a. Furthermore, the connector 23 for connecting the solar radiation sensor for the auto air conditioner is also fastened and fixed to helical bases 33a and 33b formed on the instrument panel core 1 through screw holes 23a and 23b using screws (not shown) in the same manner as the arrangement of the connector 21A for connecting the solar radiation sensor for auto lighting control. In this fixing state, the connector 23 is fitted and fixed in a connector fitting opening 34, and is connected to the solar radiation sensor (not shown) for the auto air conditioner.

Figure 6:
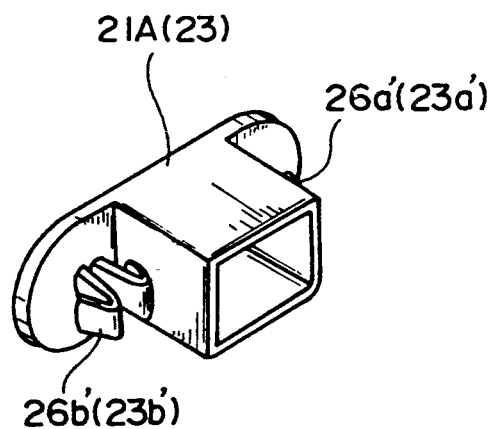
FIG. 6 is a perspective view showing an arrangement of a solar radiation sensor in the structure of the first embodiment.
Figure 7:
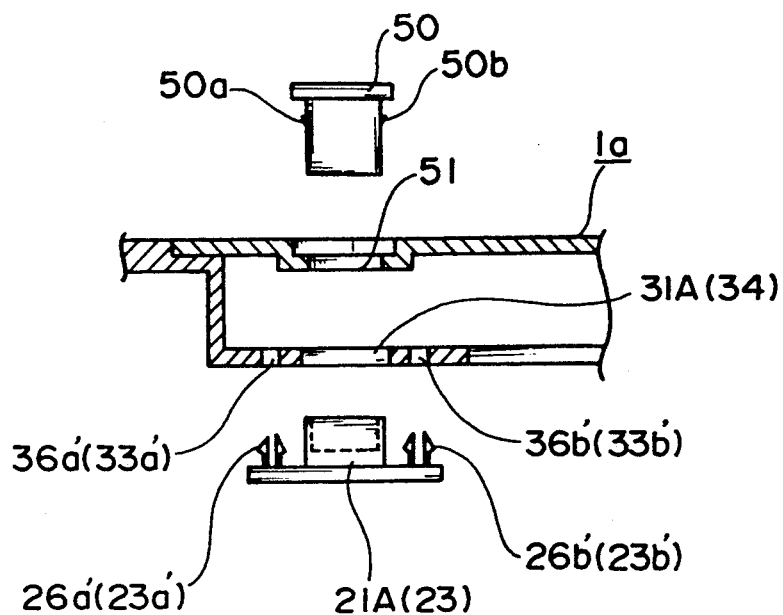
FIG. 7 is a sectional view showing a structure of a solar radiation sensor mounting portion (defroster grill portion), which employs the connector structure shown in FIG. 6.

The present invention is not limited to the above-mentioned screw fixing structures of the connectors 21A and 23 for connecting the solar radiation sensors for auto lighting control and the auto air conditioner. For example, as shown in FIGS. 6 and 7 showing the third modification, cotter pins 26a' (23a') and 26b' (23b') having engaging portions are arranged on the right and left flange portions. These cotter pins 26a' (23a') and 26b' (23b') are inserted in cotter pin insertion holes 36a' (33a') and 36b' (33b') formed in the instrument panel core 1, so that the connectors are locked in a one-touch manner. With this structure, assembling operability can be further improved.

In FIG. 7, reference numeral 50 denotes a corresponding solar radiation sensor. Engaging projections 50a and 50b are formed on two side portions of a main body of the solar radiation sensor 50. The main body of the solar radiation sensor 50 is fitted under pressure in a solar radiation sensor fitting opening 51 formed in a nozzle grill 1a of a defroster, so that the sensor and the grill can be connected by fitting in a one-touch manner. In this manner, since the upper surface side of the instrument panel core 1 is covered by the nozzle grill 1a of the defroster, the cotter pins 26a' (23a') and 26b' (23b'), and the like of the connector 21A (23) can be concealed from an external portion. Therefore, it is advantageous to employ the above-mentioned arrangement.

Figure 8:
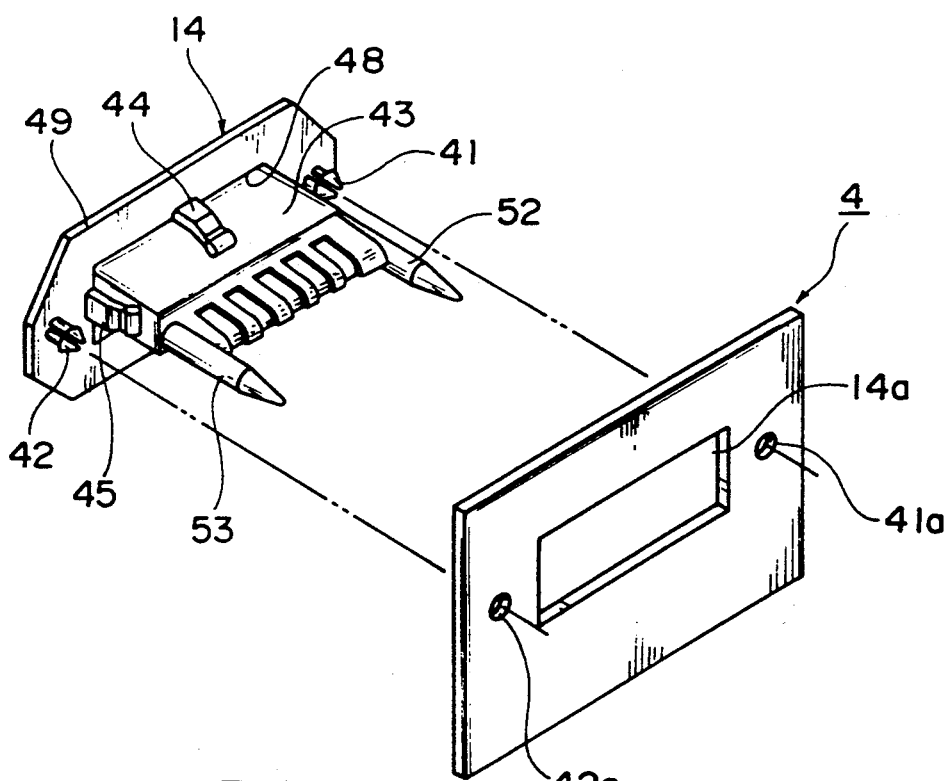
FIG. 8 is an enlarged, exploded perspective view of a connector portion for connecting, e.g., a meter node switch in the structure of the first embodiment.

Furthermore, as the connector 14, arranged on the first electrical harnessing member 7, for connecting the meter node, an aligning connector shown in FIG. 8 is employed.

More specifically, in FIG. 8, reference numeral 49 denotes a bracket, supported on the first electrical harnessing member 7, for supporting the connector. Holding pawls 46 through 47(the pawls 46 and 47 are not illustrated for the sake of convenience) for detachably holding a connector main body 43 at four positions, i.e., upper, lower, right, and left positions, are arranged on the central portion on the front surface side of the bracket 49. Cotter pins 41 and 42 for attaining one-touch engagement are arranged on the right and left sides of the connector main body 43. Pins 52 and 53, having sharp distal ends, for executing alignment upon connection project from the distal end portion of the connector main body 43 held by the holding pawls 44 through 47 toward the instrument panel mount member 4.

The distal end portion of the connector main body 43 need only be precisely inserted in the fitting opening 14a (15a) formed in correspondence with the instrument panel mount member 4 by utilizing the aligning pawls 46 and 47, so that the cotter pins 41 and 42 can be smoothly inserted in pin insertion holes 41a and 41b, thereby realizing one-touch assembling.

Therefore, in the above-mentioned arrangement of the instrument panel, when the instrument panel core 1 is mounted on the instrument panel mount member 4 fixed to the cowl portion of the vehicle body, the first and second electrical harnessing members 7 and 20 are connected to each other through the ECU module 30 in this mounting operation. With this operation, the respective node portions can be accurately connected to a power supply and control circuits.

As described above, according to the electrical harnessing structure for a vehicle of the first embodiment, the instrument panel is divided into two units, i.e., the instrument panel mount member 4 mounted on the vehicle body, and the instrument panel core 1 located at the passenger room side, thereby improving assembling operability. Since the instrument panel is divided into two units, the electrical harnessing member is divided into the first and second electrical harnessing members 7 and 20. As a result, the productivity and assembling operability of the electrical harnessing member itself can be improved at the same time. Therefore, the instrument panel as a whole can properly cope with automatic assembling operations.

At the same time, the number of connecting portions (connector portions), and the number of electric wires can be decreased. Furthermore, the corresponding positions of the connectors can become precise, thus improving assembling precision.

The present invention is not limited to the arrangement of the above-mentioned first embodiment, and various changes and modifications may be made within the spirit and scope of the invention.

For example, in the first embodiment described above, the ECU module 30 is mounted on the instrument panel mount member 4. However, the present invention is not limited to this arrangement. For example, an arrangement according to the second embodiment shown in FIG. 9 may be employed.

Figure 9:
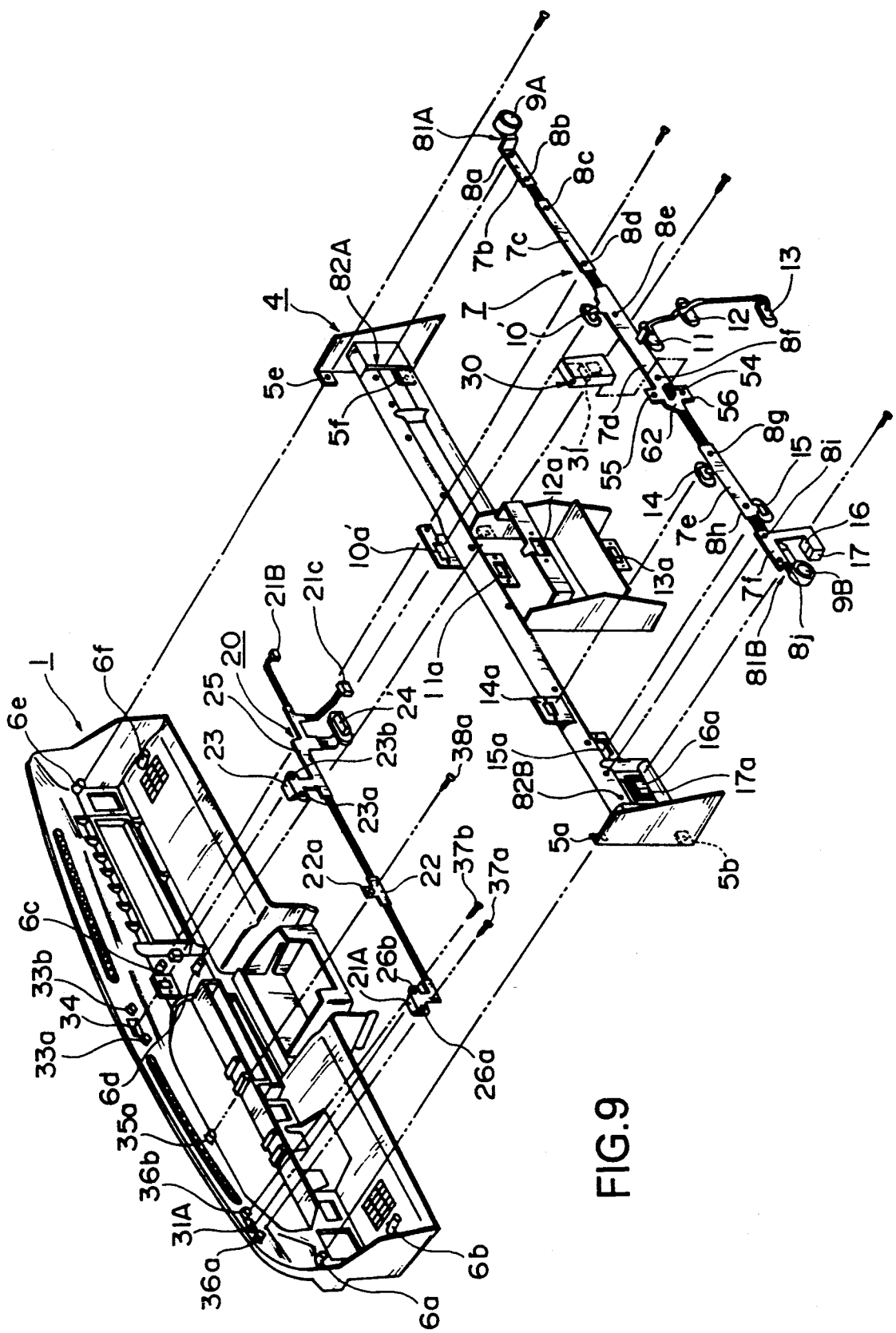
FIG. 9 is an exploded perspective view of the rear surface side of an instrument panel, which employs an electrical harnessing structure for a vehicle according to the second embodiment of the present invention.

An electrical harnessing structure for a vehicle according to the second embodiment of the present invention will be described below with reference to FIG. 9. In the following description, the same reference numerals in FIG. 9 denote the same parts as in the first embodiment described above, and a detailed description thereof will be omitted.

As the characteristic feature of the second embodiment, an ECU module 30 is arranged on the inner side of a first electrical harnessing member 7 on the side of an instrument panel mount member 4. For this purpose, flange portions 55 and 56, extending in the vertical direction, are arranged on the upper and lower edges of the left end portion of a third fixing portion 7d located at the center of the first electrical harnessing member 7. A male connector 54 is arranged on a portion of the third fixing member 7d, which portion is located between the two flange portions 55 and 56. The connector 54 is connected to a female connector 31' provided to the ECU module 30. Therefore, this arrangement is best suitable for a case wherein electronic control system products are arranged in the deepest portion in the instrument panel.

In the second embodiment, the first electrical harnessing member 7 and a second electrical harnessing member 20 are electrically connected by each other by directly coupling a connector 10' provided to the first electrical harnessing member 7, and a connector 24' provided to the second electrical harnessing member 20 through a fitting opening 10a' formed in the instrument panel mount member 4 unlike in the first embodiment.

The electrical harnessing structure in each of the first and second embodiments described above employs the multiplex transmission system as a signal transmission system. The present invention can obtain a remarkable effect, e.g., simplification of wiring in the multiplex transmission system. The present invention is not limited to the multiplex transmission system, as a matter of course.

Figure 11:
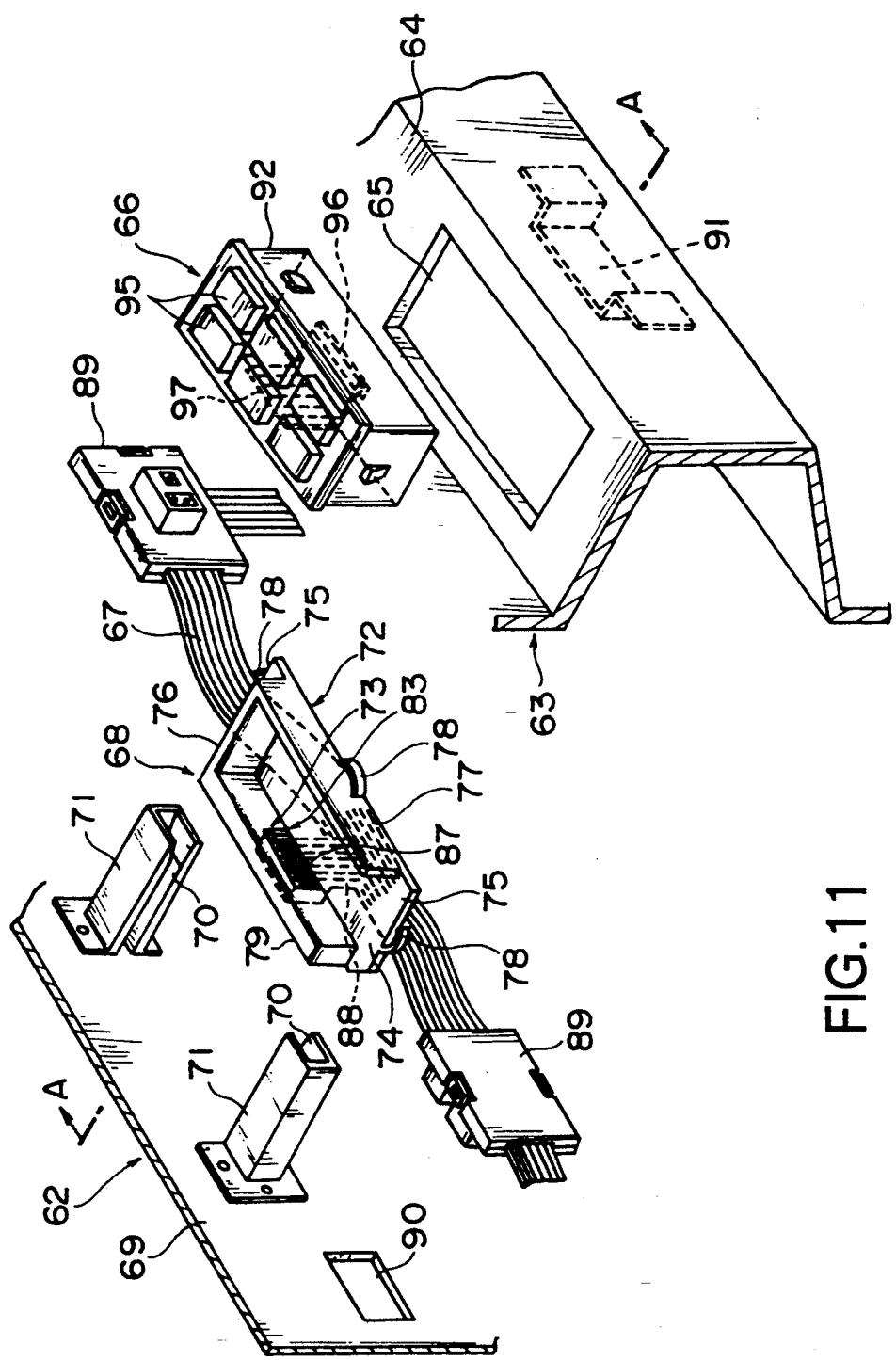
FIG. 11 is an exploded perspective view showing a schematic mounting state to a vehicle door in the harnessing structure for a switch unit shown in FIG. 10.
Figure 12:
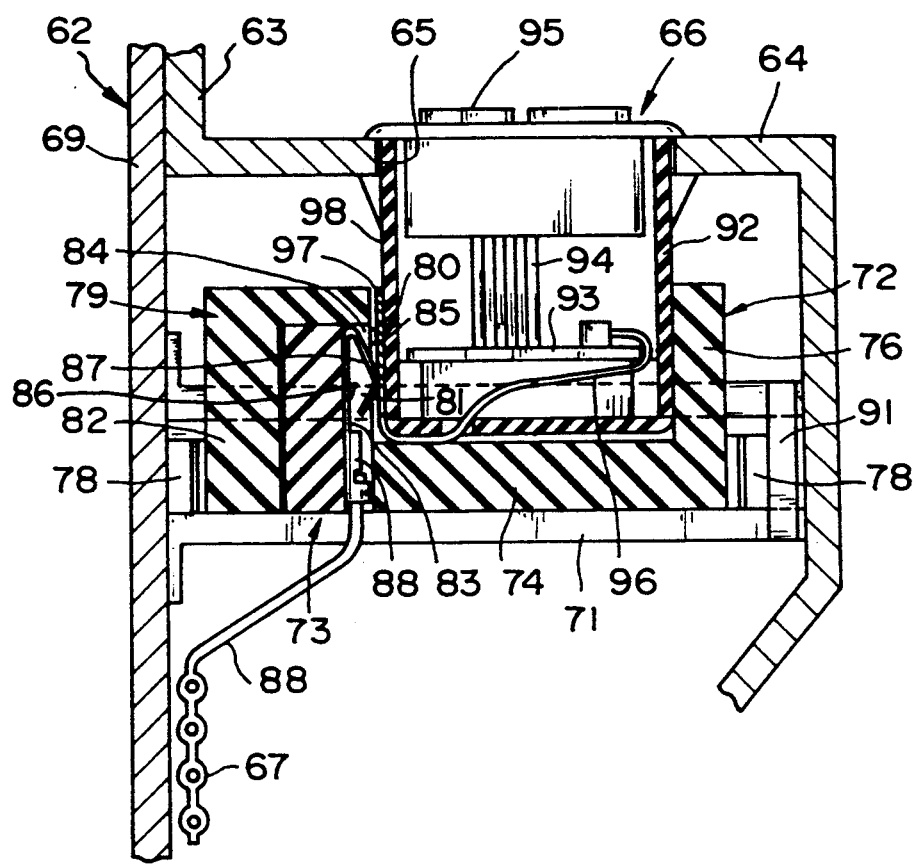
FIG. 12 is a sectional view showing an assembling state in FIG. 11 in a state taken along a line A—A in FIG. 11.

In each of the above two embodiments, as an electrical harnessing structure for electrical components for a vehicle arranged on a predetermined vehicle body component of a vehicle, the present invention is applied especially to the electrical harnessing structure for electrical components for a vehicle, which are arranged in the instrument panel. However, the present invention is not limited to this arrangement. For example, as shown in FIGS. 10 through 12 of the third embodiment, the present invention may be applied to an electrical harnessing structure for switch units as electrical components for a vehicle, which are mounted on a side door.

The electrical harnessing structure of the third embodiment will be described below. FIG. 10 is an exploded perspective view showing an arrangement of a side door to which the electrical harnessing structure of the third embodiment is applied, FIG. 11 is an exploded perspective view showing the arrangement of the electrical harnessing structure equipped in the side door, and FIG. 12 is a sectional view showing an assembling state taken along a line A—A in FIG. 11.

Figure 10:
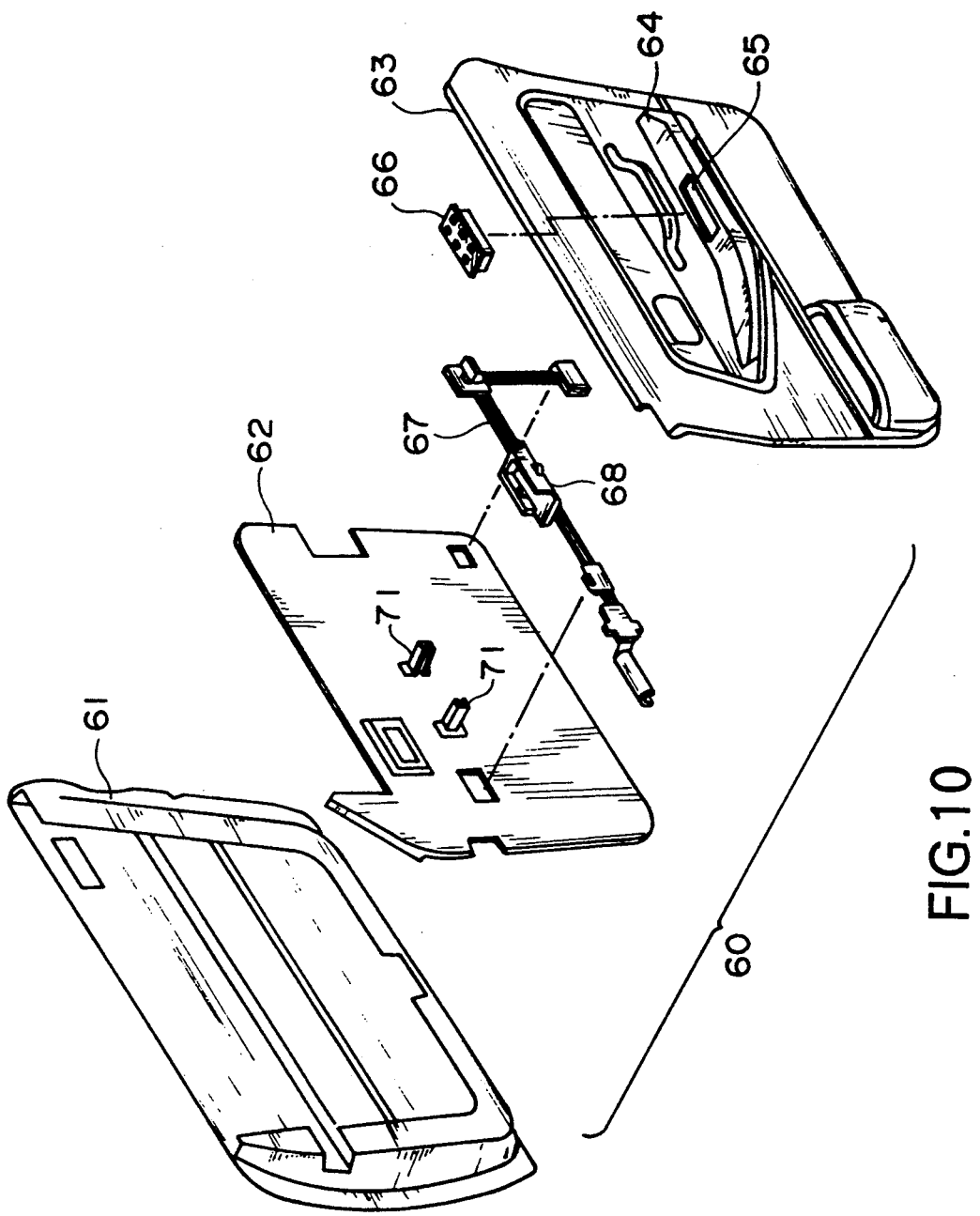
FIG. 10 is an exploded perspective view showing an arrangement of a side door, which employs an electrical harnessing structure for a switch unit according to a third embodiment of the present invention.

As shown in FIG. 10, a side door 60 comprises a door frame 61 for defining the outer side surface of a vehicle body, an inner panel 62 attached to the inner side surface of the door frame 61, and a door trim 63 adhered to the inner side surface of the inner panel 62.

An armrest portion 64 where a driver rests his or her arm is attached to the inner side surface of the door trim 63, and an opening 65 is formed in the upper surface of the armrest portion 64. A switch unit 66 is inserted in the armrest portion 64 through the opening 65 so that its upper surface covers the opening 65. A large number of power window operation switches for controlling driving operations of a power window mechanism are arranged on the upper surface of the switch unit 66. The switch unit 66 is connected to a control unit and a driving motor (neither are shown) through a flat wire harness 67. Note that a unit holder 68 for holding the lower portion of the above-mentioned switch unit 66 is attached to the inner panel 62.

As shown in FIG. 11, a pair of guide rails 71, each of which is formed of a synthetic resin or metal, and has a guide groove 70 and a U-shaped section, are fixed, through, e.g., screws, to a wall surface 69 of the inner panel 62 on a passenger room side, so that their open surfaces oppose each other, and extend in a direction perpendicular to the wall surface 69 (i.e., in the widthwise direction of the vehicle body). The unit holder 68 is locked by these guide rails 71, so that its two side edges are fitted in the corresponding guide grooves 70.

The unit holder 68 is constituted by a holder main body 72 formed of a synthetic resin, and a connector portion 73 mounted on the holder main body 72. The holder main body 72 comprises a rectangular board portion 74, a pair of right and left slide engaging portions 75 projecting from the right and left side edges of the board portion 74 so as to be respectively fitted in the guide grooves 70 of the right and left guide rails 71, and a frame portion 76 having a substantially U shape when viewed from the top, and standing upright on the board portion 74 to have an open front surface. Curved spring segments 78 integrally project from the side end faces of the slide engaging portions 75, and side surfaces 77, perpendicular to the slide engaging portions 75, of the board portion 74 or the frame portion 76, i.e., on four surfaces defining the circumferential surfaces of the holder main body 72. The frame portion 76 has a thick wall portion 79 located outward in the widthwise direction of the vehicle body. A connector storage chamber 81 having a through hole 80 communicating with the inner space surrounded by the frame portion 76, is formed in the wall portion 79 so as to be open to the bottom surface of the board portion 74, as shown in FIG. 12. The connector portion 73 is inserted in the connector storage chamber 81 from below.

On the other hand, the connector portion 73 is constituted by a housing 82 formed of a synthetic resin, and contact terminals 83 inserted in and locked by the housing 82. A plurality of terminal storage chambers 84 are juxtaposed in the inner side surface in the widthwise direction of the vehicle body of the housing 82. An opening 85 communicating with the corresponding through hole 80 of the connector storage chamber 81 is formed in the upper portion of each terminal storage chamber 84.

Each contact terminal 83 comprises an electric wire pressing portion 86 which is fixed under pressure to the mounting surface of the terminal storage chamber 84 corresponding to one end thereof, and an elastic contact portion 87 extending outward from the corresponding through hole 80 via the opening 85 corresponding to the other end thereof. Each electric wire pressing portion 86 is connected to a branch wire 88 branching from the flat wire harness 67. A connector 89 for connecting various accessories such as a power window motor, a door mirror driving motor, a door lamp for foot illumination, and the like (none of them are shown), which are arranged in the side door, is connected to an intermediate portion of the flat wire harness 67, as shown in FIG. 11. An opening 90 for receiving and connecting the connector 89 for these accessories is formed in the inner panel 62.

The assembling operations of the electrical harnessing structure with the above arrangement will be described below.

The right and left side engaging portions 75 of the unit holder 68 are respectively fitted in the guide grooves 70 of the two guide rails 71. The connector 89 for accessories is connected to a corresponding connector (not shown) facing the opening 90 formed in the inner panel 62. With this connection, the flat wire harness 67 and the unit holder 68 are temporarily fixed. The pair of spring segments 78, which are provided to the slide engaging portions 75, and separated in the back-and-forth direction of the vehicle body, permit the unit holder 68 to be movably supported in the guide rails 71 in the back-and-forth direction of the vehicle body. The door trim 63 is assembled to the inner panel 62. With this assembling operation, the opening 65 of the armrest portion 64 is located above the unit holder 68.

A contact portion 91 for the spring segment 78 at the front end of the unit holder 68 projects from the inner side surface of the armrest portion 64. With this assembling operation of the door trim 63, the pair of spring segments 78 of the unit holder 68, which are separated in the widthwise direction of the vehicle body, are respectively brought into contact with the inner panel 62 and the contact portion 91. Therefore, the unit holder 68 is automatically aligned to be movable in the back-and-forth and right-and-left directions. The switch unit 66 is inserted in the opening 65 of the armrest portion 64.

As shown in FIG. 12, the switch unit 66 comprises a rectangular box-like housing 92, and a wiring board 93 arranged in the housing 92. One flexible printed board 94 is harnessed to extend upward from the wiring board 93. A push button unit 95 connected to the flexible printed board 94 is arranged on the housing 92. The other flexible printed board 96 connected to the wiring board 93 is extracted outside the housing. On the other hand, a terminal portion 97 on the distal end side of the flexible printed board 96 corresponding to a terminal portion of the unit holder 68 is fixed to a wall surface 98 of the housing 92.

The switch unit 66 is mounted in the frame portion 76 of the unit holder 68 through the opening 65, and the terminal portions 83 and 97 are connected to each other. Even when the centers of the opening 65 and the unit holder 68 are offset from each other, the switch unit 66 can be automatically aligned by the spring segments 78, and can be smoothly mounted.

As described above, according to the third embodiment, a wire harness for connecting a door unit need not have a margin unlike the prior art, and the switch unit 66 can be inserted from the above in the opening 65 of the door trim 63, resulting in easy assembling operations. In addition, the unit holder 68 automatically aligns the switch unit 66 to absorb decentering between the opening 65 and the unit holder 68. Therefore, smooth mounting operations and reliable electrical connections can be attained at the same time, thus further improving mounting workability.

As many apparently widely different embodiments of the present invention can be made without departing from the spirit and scope thereof, it is to be understood that the invention is not limited to the specific embodiments thereof except as defined in the appended claims.

What is claimed is:

1. An electrical harnessing structure for connecting vehicle room electrical components to vehicle body electrical components, by assembling an instrument panel, to which said vehicle room electrical components provided on a vehicle room front portion are mounted, with an instrument panel core facing to the vehicle room and an instrument panel mount member facing to a vehicle body front side, and by attaching said instrument panel to a cowl panel fixed to the vehicle body front side, which comprises:

an electrical harnessing member having a bundle of electric wires, said electrical harnessing member being divided at least into a first electrical harnessing member portion mounted to said instrument panel mount member and a second electrical harnessing member portion mounted to said instrument panel core, said first electrical harnessing member portion being connected to a first electrical component group mounted to a front portion of said instrument panel, and said second electrical harnessing member portion being connected to a second electrical component group mounted to an upper portion of said instrument panel;

first mounting means for mounting said first electrical harnessing member portion to said instrument panel mount member;

second mounting means for mounting said second electrical harnessing member portion to said instrument panel core;

connect means for connecting said instrument panel mount member and said instrument panel core to each other;

at least one connector for connecting said first and second electrical harnessing member portions to each other;

a plurality of connectors for connecting said first electrical component group to said first electrical harnessing member portion;

a plurality of connectors for connecting said second electrical component group to said second electrical harnessing member portion; and at least one connector for connecting said first electrical harnessing member portion to said vehicle body electrical components.

2. The structure according to claim 1, which further comprises:

a control unit, arranged on a portion where said first and second electrical harnessing member portions are connected to each other, for executing a predetermined control sequence.

3. The structure according to claim 2, wherein said control unit is mounted on said instrument panel mount member.

4. The structure according to claim 3, wherein said control unit comprises a connector portion to which said connect means is connected.

5. The structure according to claim 1, wherein said first electrical harnessing member portion comprises a control unit for executing a predetermined control sequence.

6. The structure according to claim 2, wherein said first electrical harnessing member portion comprises a connector to be connected to a vehicle, a connector for connecting said control unit, a connector for connecting a fuel lid opener switch, a connector for connecting a trunk lid opener switch, a connector for connecting an air conditioner switch, a connector for connecting audio equipment, a connector for connecting a center console, a connector for connecting meters, and a connector for connecting column switches.

7. The structure according to claim 2, wherein said second electrical harnessing member portion comprises a connector for connecting a solar radiation sensor for auto lighting control, a connector for connecting a glove box lamp, a connector for connecting a glove box lamp switch, a connector for connecting a solar radiation sensor for an air conditioner, and a connector for connecting said control unit.

8. The structure according to claim 1, wherein a connecting portion between said first and second electrical harnessing member portions is located at a position near a fixing portion between said instrument panel core and said instrument panel mount member.

9. The structure according to claim 5, wherein said first electrical harnessing member portion comprises, as the connectors for connecting said first electrical component group to said first electrical harnessing member portion, a connector to be connected to a vehicle, a connector for connecting said control unit, a connector for connecting a fuel lid opener switch, a connector for connecting a trunk lid opener switch, a connector for connecting an air conditioner switch, a connector for connecting audio equipment, a connector for connecting a center console, a connector for connecting meters, and a connector for connecting column switches.

10. The structure according to claim 5, wherein said second electrical harnessing member portion comprises a connector for connecting a solar radiation sensor for auto lighting control, a connector for connecting a glove box lamp, a connector for connecting a glove box lamp switch and a connector for connecting a solar radiation sensor for an air conditioner.

* * * * *

UNITED STATES PATENT AND TRADEMARK OFFICE
CERTIFICATE OF CORRECTION

PATENT NO. : 5,324,203

DATED : June 28, 1994

INVENTOR(S) : SANO, et al.

It is certified that error appears in the above-indentified patent and that said Letters Patent is hereby corrected as shown below:

Title Page, [57], Abstract, line 1, delete "to".

Col. 2, line 29, delete "to" (first occurrence).

Col. 8, line 24, after "portions" delete space;
line 51, after "47" (first occurrence) insert space.

Signed and Sealed this

Eighth Day of August, 1995

Attest:

BRUCE LEHMAN

*Attesting Officer*     *Commissioner of Patents and Trademarks*